(12) United States Patent
Kim et al.

(10) Patent No.: US 9,696,596 B2
(45) Date of Patent: Jul. 4, 2017

(54) LIQUID CRYSTAL DISPLAY PANEL

(71) Applicant: Samsung Display Co., Ltd., Yongin, Gyeonggi-Do (KR)

(72) Inventors: Jang-Il Kim, Asan-si (KR); YeoGeon Yoon, Suwon-si (KR); Sei-yong Park, Suwon-si (KR); Osung Seo, Seoul (KR); Sunghee Hong, Hwaseong-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 102 days.

(21) Appl. No.: 14/599,632

(22) Filed: Jan. 19, 2015

(65) Prior Publication Data

US 2015/0261045 A1 Sep. 17, 2015

(30) Foreign Application Priority Data

Mar. 11, 2014 (KR) ........................ 10-2014-0028452

(51) Int. Cl.
*G02F 1/1343* (2006.01)
*G02F 1/1337* (2006.01)

(52) U.S. Cl.
CPC .. *G02F 1/134309* (2013.01); *G02F 1/133707* (2013.01); *G02F 2001/133742* (2013.01); *G02F 2001/134318* (2013.01); *G02F 2001/134345* (2013.01)

(58) Field of Classification Search
CPC ... G02F 1/133707; G02F 2001/134318; G02F 1/134309; G02F 2001/133742; G02F 2001/134345
See application file for complete search history.

(56) References Cited

U.S. PATENT DOCUMENTS

| | | |
|---|---|---|
| 8,395,736 B2 | 3/2013 | Shin et al. |
| 8,482,709 B2 | 7/2013 | Shin et al. |
| 8,537,314 B2 | 9/2013 | Lee et al. |
| 2004/0125296 A1* | 7/2004 | Sasabayashi ..... G02F 1/134309 349/129 |

(Continued)

FOREIGN PATENT DOCUMENTS

| | | |
|---|---|---|
| JP | 11352486 A | 12/1999 |
| JP | 2008145700 A | 6/2008 |

(Continued)

*Primary Examiner* — Jessica M Merlin
(74) *Attorney, Agent, or Firm* — Cantor Colburn LLP

(57) ABSTRACT

A display panel curved in a first direction includes: first and second areas corresponding to two segments of a pixel divided by a line in a second direction perpendicular to the first direction; and a first electrode, in which first sub horizontal openings are defined in the first area, and second sub horizontal openings are defined in the second area, where the first and second sub horizontal openings extend along the first direction; a second substrate including: third and fourth areas corresponding to two segments of the pixel divided by a line in the first direction; and a second electrode, in which first vertical openings are defined in the third area, and second vertical openings are defined in the fourth area, where the first and second vertical openings extend along the second direction; and a liquid crystal layer between the first and second substrates.

17 Claims, 13 Drawing Sheets

(56) References Cited

U.S. PATENT DOCUMENTS

| | | | |
|---|---|---|---|
| 2009/0161048 A1* | 6/2009 | Satake | G02F 1/133305 |
| | | | 349/110 |
| 2009/0325453 A1* | 12/2009 | Lee | C09K 19/36 |
| | | | 445/58 |
| 2012/0001840 A1* | 1/2012 | Ohgami | G02F 1/1337 |
| | | | 345/92 |
| 2013/0176521 A1 | 7/2013 | Jung et al. | |
| 2013/0285891 A1* | 10/2013 | Zhang | G02F 1/133707 |
| | | | 345/90 |

FOREIGN PATENT DOCUMENTS

| | | |
|---|---|---|
| JP | 2008185666 A | 8/2008 |
| KR | 100315923 B1 | 11/2001 |
| KR | 100510437 B1 | 8/2005 |
| KR | 101200826 B1 | 11/2012 |

\* cited by examiner

LIQUID CRYSTAL DISPLAY PANEL

This application claims priority to Korean Patent Application No. 10-2014-0028452, filed on Mar. 11, 2014, and all the benefits accruing therefrom under 35 U.S.C. §119, the content of which in its entirety is herein incorporated by reference.

BACKGROUND

1. Field

Exemplary embodiments of the invention described herein relate to a liquid crystal display ("LCD") panel, and more particularly, relate to a curved LCD panel.

2. Description of the Related Art

An LCD panel, which is a type of flat display panel, is widely used for expressing images in various electronic apparatuses such as television sets, monitors, laptop computers, mobile phones, and so forth.

In such an LCD panel, an electric field is applied to a liquid crystal layer interposed between a pair of substrates and adjusted in strength to control intensity of light transmitted through the substrate from a backlight assembly.

In recent, a curved LCD panel is being developed, as a curve LCD panel provides a display area with a curved surface rendering a user to feel an enhanced sensation of stereoscopy, immersion, and reality.

SUMMARY

Exemplary embodiments of the invention relate to a liquid crystal display ("LCD") panel with improved quality of images expressed in a curved display area.

In an exemplary embodiment, a display panel curved along a first direction includes a first substrate including: first and second areas corresponding to two segments of a pixel divided by an imaginary line in a second direction perpendicular to the first direction; and a first electrode, in which a plurality of first sub horizontal openings is defined in the first area, and a plurality of second sub horizontal openings is defined in the second area, where the first and second sub horizontal openings extend along the first direction; a second substrate opposite to the first substrate and including: third and fourth areas corresponding to two segments of the pixel divided by an imaginary line in the first direction; and a second electrode, in which a plurality of first vertical openings is defined in the third area, and a plurality of second vertical openings is defined in the fourth area, where the first and second vertical openings extend along the second direction; and a liquid crystal layer interposed between the first and second substrates.

In an exemplary embodiment, a main horizontal opening is defined in the second electrode in the first direction along a boundary of the third and fourth areas, the first vertical openings are branched out from the main horizontal opening toward the second direction, and the second vertical openings are branched out from the main horizontal opening toward a third direction opposite to the second direction.

In an exemplary embodiment, the first vertical openings may be substantially symmetrical to the second vertical openings with respect to the main horizontal opening.

The first sub horizontal openings may be substantially symmetrical to the second sub horizontal openings along a boundary of the first and second areas.

In an exemplary embodiment, the second electrode may include: a plurality of first vertical branches disposed in the third area and defining the first vertical openings; and a plurality of second vertical branches disposed in the fourth area and defining the second vertical openings. In such an embodiment, the first electrode may include: a vertical stalk extending substantially in the second direction along the boundary of the first and second areas; and a plurality of horizontal branches bilaterally extending along the first direction from the vertical stalk and defining the first and second sub horizontal openings.

In an exemplary embodiment, the third and fourth areas may be defined in sequence along the third direction, the first vertical opening may be spaced apart in the third direction toward a center of the pixel from a horizontal branch which is disposed farthest in the second direction among the horizontal branches, and the second vertical opening may be spaced apart in the second direction toward the center of the pixel from a horizontal branch which is disposed farthest in the third direction among the horizontal branches.

In an exemplary embodiment, the horizontal branches may include: a plurality of first horizontal branches extending from the vertical stalk toward the first direction and disposed in the first area; and a plurality of second horizontal branches extending from the vertical stalk toward a fourth direction reverse to the first direction and disposed in the second area.

In an exemplary embodiment, the pixel may be divided into a plurality of domains, and pretilt directions of liquid crystal molecules of the liquid crystal layer in the domains may be different from each other.

In an exemplary embodiment, the plural domains may include first through fourth domains, the first domain may be defined by an overlapping region of the second area and the third area, the second domain may be defined by an overlapping region of the first area and the third area, the third domain may be defined by an overlapping region of the first area and the fourth area, and the fourth domain may be defined by an overlapping region of the second area and the fourth area.

In an exemplary embodiment, a realignment direction of the liquid crystal molecules in the first domain may be determined by a vector sum of the first and third direction, a realignment direction of the liquid crystal molecules in the second domain may be determined by a vector sum of the third and fourth directions, a realignment direction of the liquid crystal molecules in the third domain may be determined by a vector sum of the second and fourth directions, and a realignment direction of the liquid crystal molecules in the fourth domain may be determined by a vector sum of the first and second directions.

In an exemplary embodiment, realignment directions of the liquid crystal molecules of the liquid crystal layer in the domains may be different from each other.

In an exemplary embodiment, the first substrate may further include a first alignment film interposed between the liquid crystal layer and the first electrode, and the second substrate may further include a second alignment film interposed between the liquid crystal layer and the second electrode.

In an exemplary embodiment, the first and second alignment films may include a photohardening layer including a side-chain polymer which maintains pretilts of the liquid crystal molecules adjacent thereto.

In an exemplary embodiment, widths of the first and second vertical openings may be substantially the same as each other.

In an exemplary embodiment, widths of the first and second sub horizontal openings may be substantially the same as each other.

In an exemplary embodiment, liquid crystal molecules of the liquid crystal layer may be homeotropically aligned and have negative permittivity.

In an exemplary embodiment, the first and second electrodes may include a transparent conductive material.

BRIEF DESCRIPTION OF THE FIGURES

The above and other features of the invention will become more apparent by describing in further detail exemplary embodiments thereof with reference to the accompanying drawings, in which.

DETAILED DESCRIPTION

Figure 1:
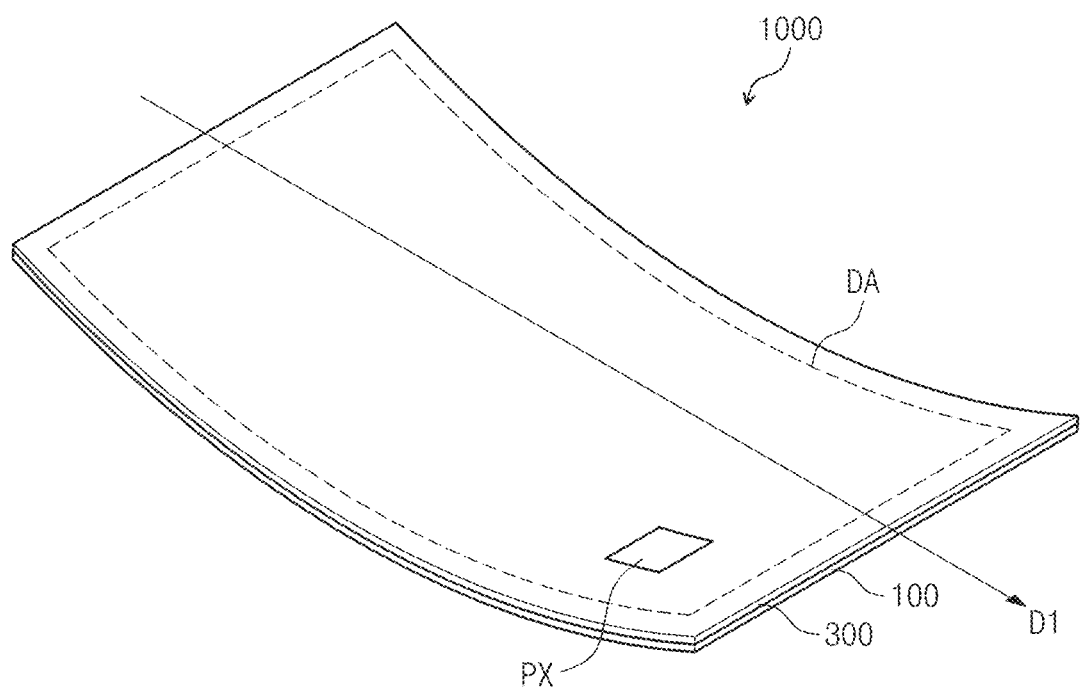
FIG. 1 is a perspective view of an exemplary embodiment of a liquid crystal display ("LCD") panel according to the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, exemplary embodiments of the invention will be described in detail with reference to the attached drawings.

FIG. 1 is a perspective view of an exemplary embodiment of a liquid crystal display ("LCD") panel according to the invention.

Referring to FIG. 1, an exemplary embodiment of the LCD panel 1000 includes a display area DA in which an image is displayed. The LCD panel 1000 may have a shape of a bent or curved sheet, such that the LCD panel 1000 may display an image with enhanced sensations of stereoscopy, immersion, and reality.

The LCD panel 1000 may include an array substrate 100, an opposite substrate 300 and a liquid crystal layer 200. The opposite substrate 300 is disposed opposite to and coupled with the array substrate 100, and the liquid crystal layer 200 is interposed between the array substrate 100 and the opposite substrate 300.

The LCD panel 1000 includes a plurality of pixels PX arranged substantially in a matrix form on the display area DA. Each pixel displays an image in response to a signal applied thereto.

In an exemplary embodiment of the invention, the LCD panel 100 is curved along a first direction D1. Accordingly, the array substrate 100 may be shaped partly or entirely in a curve along the first direction D1, and the display area DA may be also shaped in a curve along the first direction D1. In an exemplary embodiment, the opposite substrate 300 may be shaped in a curve along with the array substrate 100.

Figure 2:
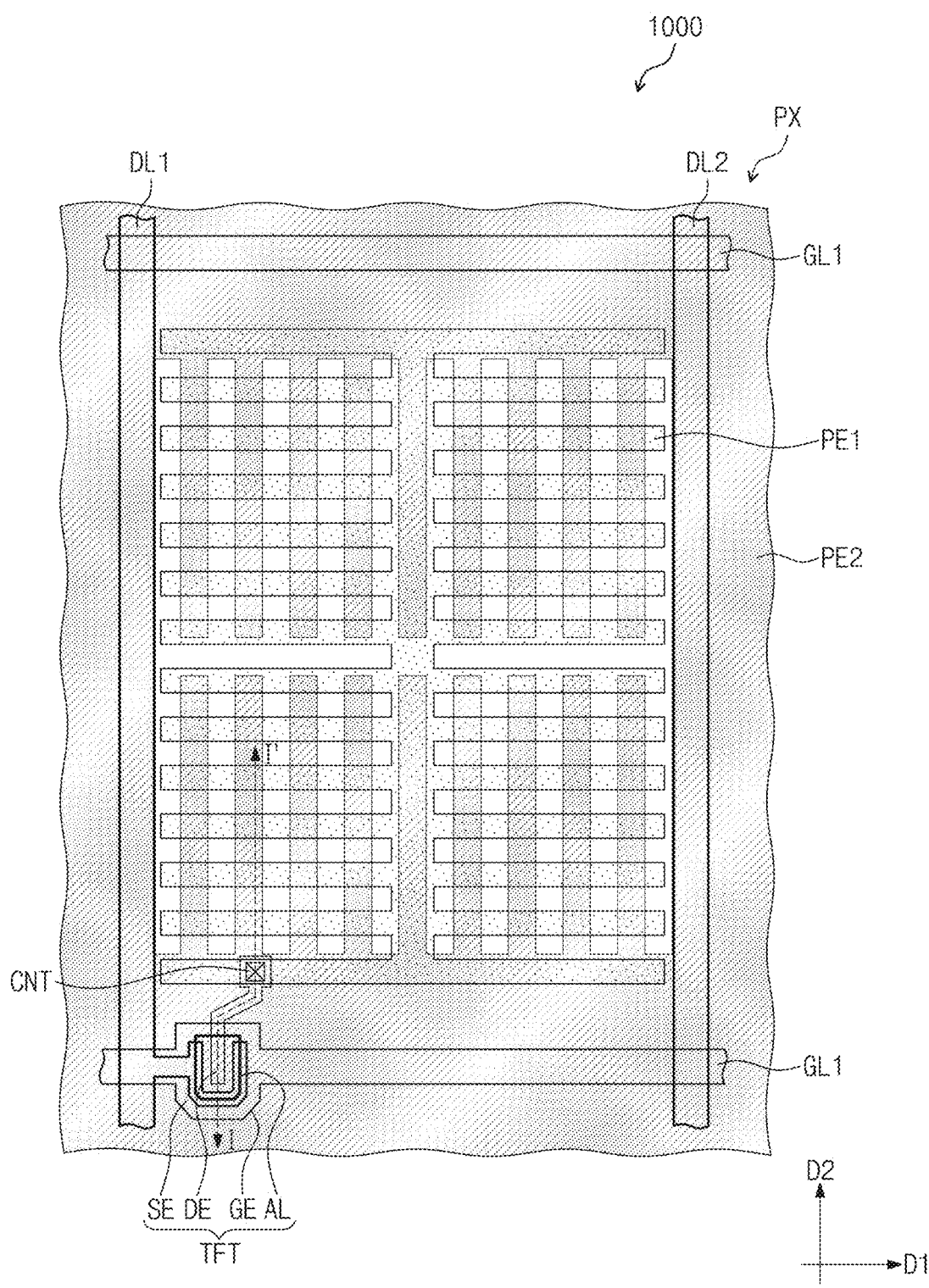
FIG. 2 is a plan view illustrating an exemplary embodiment of a pixel shown in FIG. 1.
Figure 3:
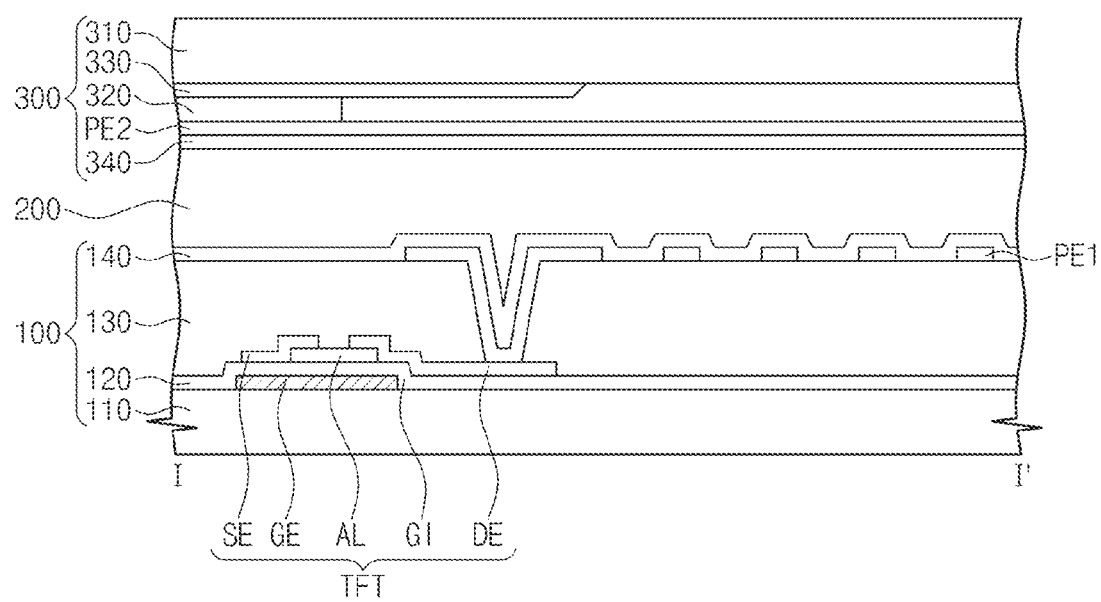
FIG. 3 is a sectional view taken along line I-I' of FIG. 2.

FIG. 2 is a plan view illustrating an exemplary embodiment of a pixel shown in FIG. 1, and FIG. 3 is a sectional view taken along line I-I' of FIG. 2.

In an exemplary embodiment, the pixels PX are substantially the same as each other in configuration and function, and one pixel PX will hereinafter be described in detail for convenience of description.

The LCD panel 1000 includes a plurality of gate lines and a plurality of data lines crossing the gate lines. FIGS. 1 and 3 shows first and second gate lines GL1 and GL2 of the gate lines, and first and second data lines DL1 and DL2 of the data lines, all of which are adjacent to the pixel PX.

The pixel PX is interposed between the first and second data lines DL1 and DL2 which are sequentially arranged. The pixel PX is electrically connected to the first data line DL1, and receives a data signal from the first data line DL1. The first and second gate lines GL1 and GL2 are insulated from while crossing the first and second data lines DL1 and DL2.

The array substrate 100 includes a first base substrate 110, a gate insulation film 120, an intermediate insulation film 130 and a first alignment film 140.

The first base substrate 110 functions as a base substrate of the first array substrate 100. In one exemplary embodiment, for example, the first base substrate 100 may be an insulation substrate, e.g. a plastic substrate, having the characteristics of high optical transmittance and flexibility.

The pixel PX includes a thin film transistor TFT and a first electrode PE1.

The thin film transistor TFT includes a gate electrode GE, a gate insulation film 120, a semiconductor layer AL, a source electrode SE, and a drain electrode DE. The gate electrode GE is disposed on the first base substrate AL and branched out from the first gate line GL1. The semiconductor layer AL may be disposed on the gate electrode GE, and the gate insulation film 120 is disposed between the semiconductor layer AL and the gate electrode GE. The source electrode SE is branched out from the first data line DL1 to contact the semiconductor layer AL, and the drain electrode DE is isolated from the source electrode SE to contact the semiconductor layer AL.

The intermediate insulation film 130 is configured to cover the thin film transistor TFT. A contact hole CNT is defined through the intermediate insulation film 130 to expose the drain electrode DE. The first electrode PE1 is disposed on the intermediate insulation film 130 and electrically connected to the drain electrode DE through the contact hole CNT. The first electrode PE1 may include or be made of a transparent conductive material. In one exemplary embodiment, the first electrode PE1, for example, may be made of a conductive metal oxide such as indium tin oxide ("ITO"), indium zinc oxide ("IZO"), indium tin zinc oxide ("ITZO"), and so on. The first alignment film 140 is configured to cover the first electrode PE1. The first alignment film 140 allows liquid crystal molecules adjacent thereto in the liquid crystal layer 200 to pretilt in a predetermined direction. The first alignment film 300 will be detailed later in greater detail with reference to FIG. 8.

The opposite substrate 300 includes a second base substrate 310, a color filter 320, a black matrix 330, a second electrode PE2, and a second alignment film 340.

The second base substrate 310 functions as a base substrate of the opposite substrate 300. In one exemplary embodiment, for example, the second base substrate 310 may include or be formed of an insulation substrate such as a plastic substrate, having high optical transmittance and flexibility.

The black matrix 330 is disposed on the second base substrate 310 in correspondence with a shading region. The shading region may be defined as an area in which the plurality of data lines, the thin transistor TFT and the plurality of gate lines are disposed. In such an embodiment, the black matrix 330 is disposed in the shading region to block light that may be transmitted due to misalignment of liquid crystal molecules in an area around the first electrode PE1.

The color filter 320 is disposed on the second base substrate 310, and provides colors for light transmitted through the liquid crystal layer 200. In an exemplary embodiment, as shown in FIG. 3, the color filter 320 is provided on the second base substrate 310, but not being limited thereto. In an alternative exemplary embodiment, the color filter 320 may be, without restriction hereto, disposed on the first base substrate 110.

The second electrode PE2 is disposed on the color filter 320, and generates an electric field to control an alignment of the liquid crystal layer 200 corresponding thereto together with the first electrode PE1. The second electrode PE2 may include or be made of a transparent conductive material. In one exemplary embodiment, for example, the second electrode PE2 may be made of a conductive metal oxide such as ITO, IZO, ITZO, and so on.

The second alignment film 340 is configured to cover the second electrode PE2. The second alignment film 340 allows liquid crystal molecules corresponding thereto in the liquid crystal layer 340 to pretilt in a predetermined direction. A pretilt direction of the liquid crystal molecules adjacent to or by the second alignment film 340 may be different from a pretilt direction of liquid crystal molecules adjacent to or by the first alignment film 140. The first alignment film 140 will be detailed later in greater detail with reference to FIG. 9.

The liquid crystal molecules of the liquid crystal layer 200 may have negative dielectric anisotropy, and aligned along a direction substantially perpendicular to the array substrate 100 and the opposite substrate 300.

Figure 4:
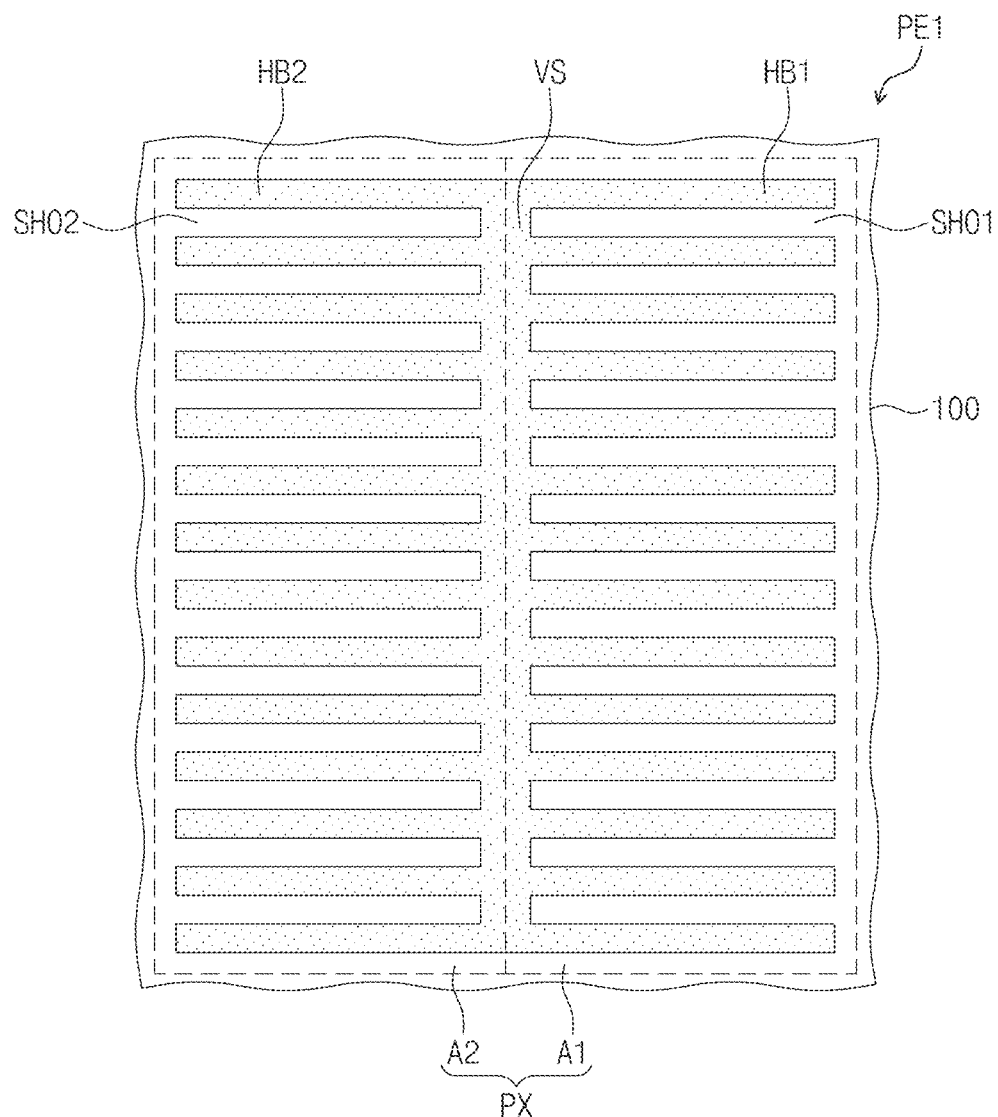
FIG. 4 is a plan view of an exemplary embodiment of the first electrode shown in FIG. 3.
Figure 4:
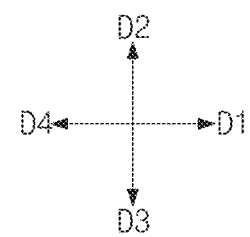
Figure 5:
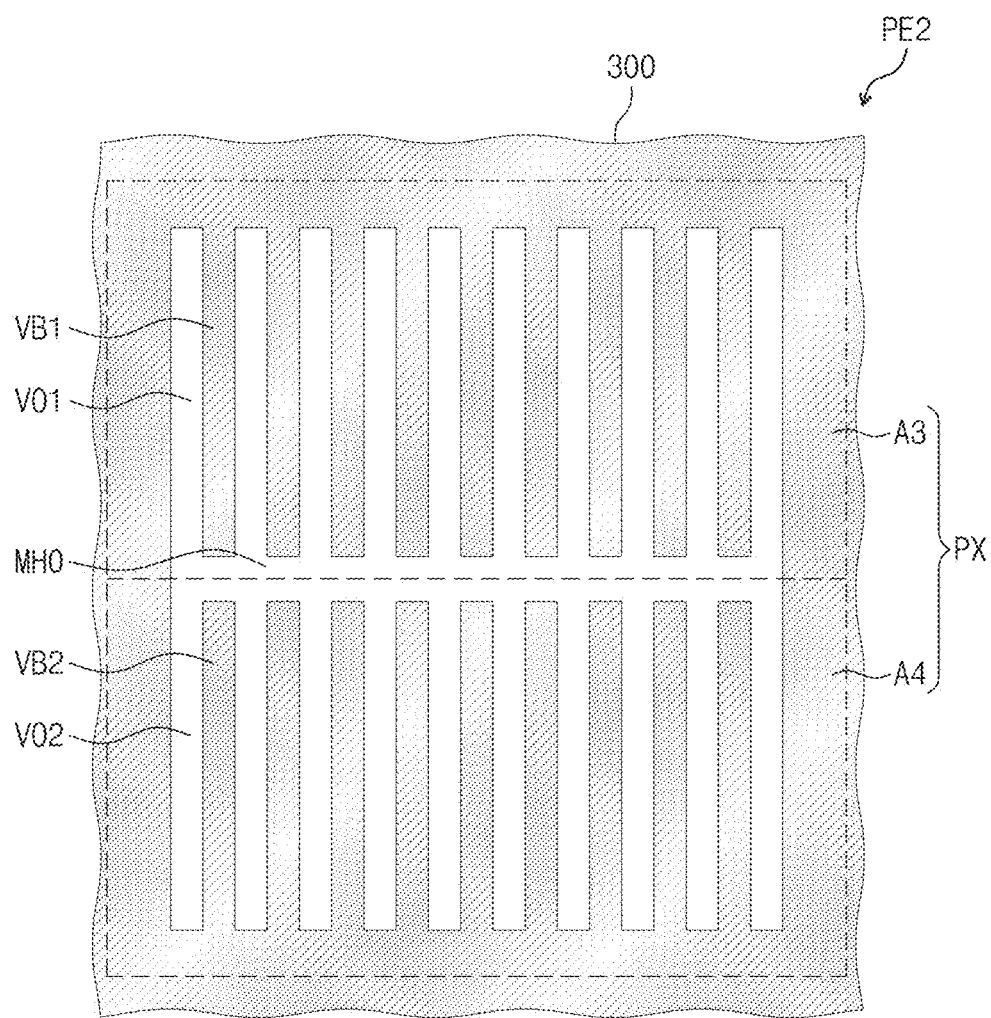
FIG. 5 is a plan view of an exemplary embodiment of the second electrode shown in FIG. 3.
Figure 5:
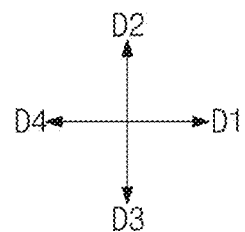

FIG. 4 is a plan view of an exemplary embodiment of the first electrode PE1 shown in FIG. 3, and FIG. 5 is a plan view of an exemplary embodiment of the second electrode PE2 shown in FIG. 3.

Referring to FIG. 4, the array substrate 100 includes first and second areas A1 and A2 corresponding to two segments of the pixel PX divided by an imaginary line in a second direction D2 perpendicular to the first direction D1. The second area A2 and the first area A1 are sequentially arranged along the first direction D1.

The first electrode PE1 includes a vertical stalk VS extending substantially parallel to the second direction D2 along an boundary line of the first and second areas A1 and A2, and a plurality of horizontal branches bilaterally extending from the vertical stalks VS. The horizontal branch portions include a plurality of first horizontal branches HB1 extending from the vertical stalk VS toward the first direction D1, and a plurality of second horizontal branches HB2 extending from the vertical stalk VS toward a fourth direction D4 opposite to the first direction D1.

The pluralities of first and second horizontal branches HB1 and HB2 may be symmetrically arranged with each other from the vertical stalk VS. In such an embodiment, widths of the first and second horizontal branches HB1 and HB2 are substantially the same as each other.

A plurality of first sub horizontal openings SHO1 are defined in the first electrode PE1 by the vertical stalk VS and the first horizontal branches HB1, and a plurality of second sub horizontal openings SHO2 are defined in the first electrode PE1 by the vertical stalk VS and the second horizontal branches HB2. The first sub horizontal openings SHO1 are in the first area A1, and extending along the first direction D1. The second sub horizontal openings SHO2 are in the second area A2, and extending along the fourth direction D4.

The first and second sub horizontal openings SHO1 and SHO2 may be symmetrically arranged each other with reference to the vertical stalk VS. In such an embodiment, widths of the first and second sub horizontal openings SHO1 and SHO2 are substantially the same as each other.

Referring to FIG. 5, the opposite substrate 300 includes third and fourth areas A3 and A4 corresponding to two segment of the pixel PX divided by an imaginary line in the first direction D1. The third and fourth areas A3 and A4 are sequentially arranged along a third direction D3 opposite to the second direction D2.

The second electrode PE2 includes a plurality of first vertical branches VB1 disposed in the third area A3, and a plurality of second vertical branches VB2 disposed in the fourth area A4.

The first vertical branches VB1 extend toward the third direction D3, but spaced apart from each other in the first direction D1. The second vertical branches VB2 extend toward the second direction D2, and spaced apart from each other in the first direction D1. Spaces between the first vertical branches VB1 define a plurality of first vertical openings VO1, respectively, and spaces between the second vertical branches VB2 define as a plurality of second vertical openings VO2, respectively.

The first and second vertical branches VB1 and VB2 may be symmetrically arranged each other with reference to a boundary line of the third and fourth areas A3 and A4. In such an embodiment, widths of the first and second vertical branches VB1 and VB2 are substantially the same as each other.

The first and second vertical branches VB1 and VB2 are spaced apart from each other, and a main horizontal opening MHO is defined between the first and second vertical branches VB1 and VB2 along the boundary line of the third and fourth areas A3 and A4. The main horizontal opening MHO is connected to the first and second vertical openings VO1 and VO2.

The first vertical branches VB1 extend toward the second direction D2 from the main horizontal opening MHO, while the second branches VB2 extend toward the third direction D3 from the main horizontal opening MHO.

The first and second vertical openings VO1 and VO2 may be symmetrically arranged with reference to the main horizontal opening MHO. In such an embodiment, widths of the first and second vertical openings VO1 and VO2 are substantially the same as each other.

Figure 6:
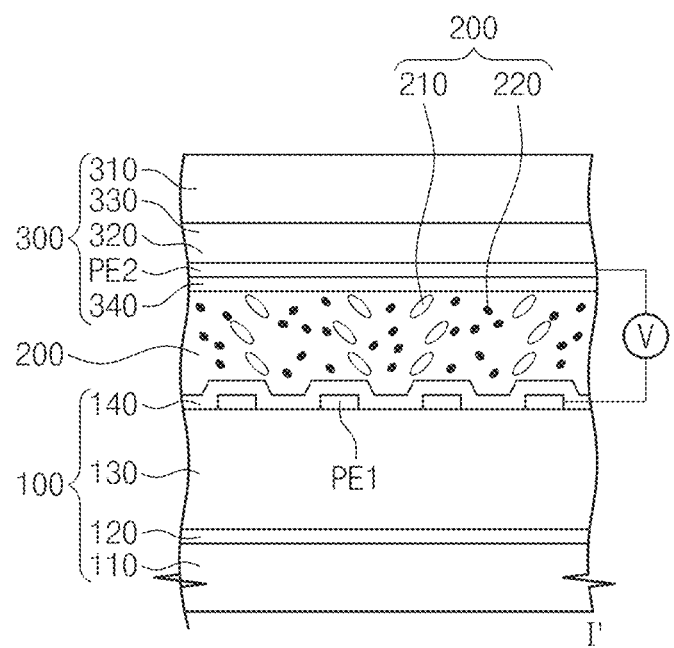
FIGS. 6 and 7 are sectional views illustrating an exemplary embodiment of a procedure of pretilting liquid crystal molecules of the liquid crystal layer shown in FIG. 3.
Figure 7:
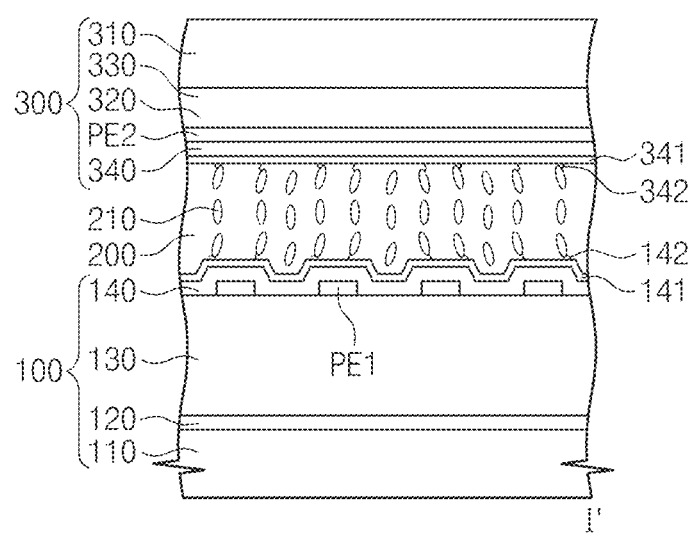

FIGS. 6 and 7 are sectional views illustrating an exemplary embodiment of a procedure of pretilting liquid crystal molecules of the liquid crystal layer shown in FIG. 3.

Referring to FIGS. 6 and 7, the first and second alignment films 140 and 340 may be disposed on the first and second substrates 110 and 310, respectively, using an inkjet or roll printing technique. In such an embodiment, the first and second alignment films may be made of a material generally used for a vertical alignment ("VA") mode or a twisted nematic (TN) mode, which is well known in the art.

The liquid crystal layer 200 may be made of a mixture composed of liquid crystal molecules 210 and a photohardener 220. The photohardener 220 may have a weight ratio less about 1.0 weight percent (wt %) based on the liquid crystal layer 200.

According to an exemplary embodiment of the invention, the photohardener 220 may be made of reactive mesogen ("RM"). Herein, the term 'mesogen' means a kind of photocurable low or high molecular copolymer including a mesogen group having the characteristics of liquid crystals. The RM may be formed of or include, for example, acrylate, metacrylate, epoxy, oxetane, vinyl-ether, styrene, or thiolene group. In an exemplary embodiment, the reactive mesogen may be formed of a material structured in a shape of bar, banana, board, or disc.

In an exemplary embodiment, the liquid crystal layer 200 may further include a photoinitiator (not shown). The photoinitiator may have a weight ratio in a range of about 0.01 wt % to about 1 wt % based on the total weight of the photohardener 220 in the liquid crystal layer 200. The photoinitiator may absorb ultraviolet rays ("UV") to dissolve itself into radicals, thereby accelerating photopolymerization of the photohardener 220.

An electric field is generated between the array substrate 100 and the opposite substrate 300 when voltages V are supplied to the first and second electrodes PE1 and PE2 of the array substrate 100 as shown in FIG. 6.

The electric field induces an alignment of the liquid crystal molecules 210 included in the liquid crystal layer.

While the electric field is generated between the array substrate 100 and the opposite substrate 300, light, e.g. UV, is irradiated on the liquid crystal layer 200, to perform an electric-field exposure process. The light may be irradiated on one or both sides of the array substrate 100 and the opposite substrate 200.

When the light is irradiated on the liquid crystal layer 200 while the electric field is generated, the liquid crystal molecules 210 adjacent to the first alignment film 140 are arranged with tilts substantially parallel to the lengthwise direction of the first and second sub horizontal openings SHO1 and SHO2. The liquid crystal molecules 210 adjacent to the second alignment film 340 are arranged with tilts substantially parallel to the lengthwise direction of the first and second vertical openings VO1 and VO2.

The photohardener 220 residing in the liquid crystal layer 200 is cured with the same tilt angle, substantially as like the liquid crystal molecules 210 on the first and second alignment films 140 and 340, by the light irradiated thereon. Accordingly, as illustrated in FIG. 5, first and second photohardening layers 141 and 341 are provided or formed respectively on the first and second alignment films 140 and 340.

When the electric field is not applied to the liquid crystal molecules 210, side-chain polymers 142 and 342 of the first and second photohardening layers 141 and 341 effectively maintain the orientation of the liquid crystal molecules 210 adjacent thereto. As such, the liquid crystal molecules 210 are effectively maintained to pretilt substantially parallel to the lengthwise direction of the first and second sub horizontal openings SHO1 and SHO2 and the first and second vertical openings VO1 and VO2 by the polymers of the first and second photohardening layers 141 and 341. Accordingly, the liquid crystal molecules 210 are rapidly tilted when an electric field is generated to activate the LCD panel 1000, thereby shortening a response time of the LCD panel 1000. Hereinafter, pretilt directions of the liquid crystal molecules 210 on a plan view will be described in reference to FIGS. 8 and 9.

Figure 8:
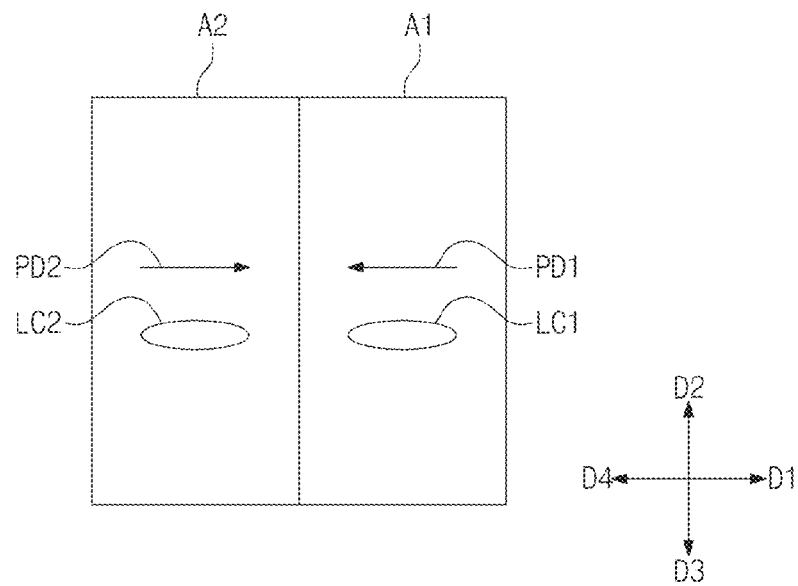
FIG. 8 is a plan view illustrating the first and second areas shown in FIG. 4.
Figure 9:
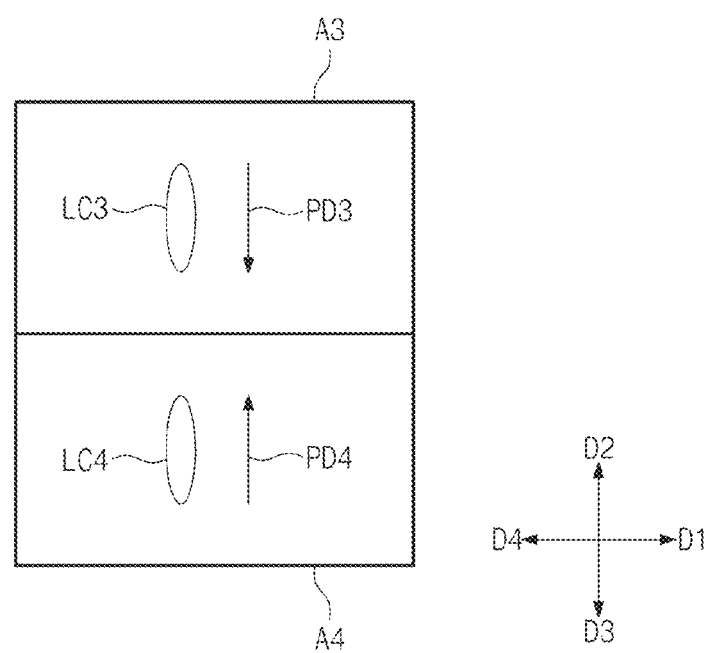
FIG. 9 is a plan view illustrating the third and fourth areas shown in FIG. 5.
Figure 10:
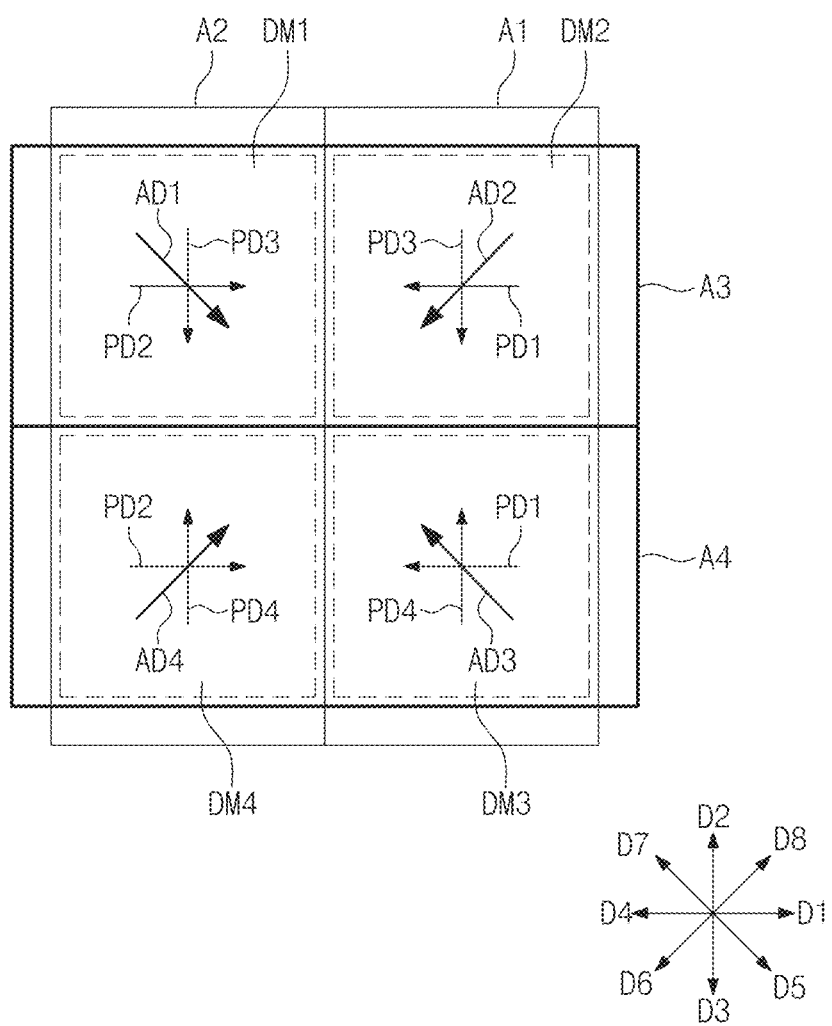
FIG. 10 is a plan view schematically illustrating domains of the pixel.

FIG. 8 is a plan view illustrating the first and second areas shown in FIG. 4, FIG. 9 is a plan view illustrating the third and fourth areas shown in FIG. 5, and FIG. 10 is a plan view schematically illustrating domains of the pixel.

Referring to FIG. 8, in an exemplary embodiment, a pretilt direction PD1 of a first liquid crystal molecule LC1 disposed adjacent to the first alignment film 140 in the first area A1 may be set in the fourth direction D4 by the first alignment film 140. In such an embodiment, a second pretilt direction PD2 of a second liquid crystal molecule LC2 disposed adjacent to the first alignment film 140 in the second area A2 may be set in the first direction D1 by the first alignment film 140. Accordingly, when no electric field is applied thereto, the first liquid crystal molecule LC1 is tilted toward the first pretilt direction PD1 and the second liquid crystal molecule LC2 is tilted toward the second pretilt direction PD2.

Referring to FIG. 9, in an exemplary embodiment, a third pretilt direction PD3 of a third liquid crystal molecule LC3 disposed adjacent to the second alignment film 340 in the third area A3 may be set in the third direction D3 by the second alignment film 340. In such an embodiment, a fourth pretilt direction PD4 of a fourth liquid crystal molecule LC4 disposed adjacent to the second alignment film 340 in the fourth area A4 may be set in the second direction D2 by the second alignment film 340. Accordingly, when no electric field is applied thereto, the third liquid crystal molecule LC3 is tilted toward the third pretilt direction PD3 and the fourth liquid crystal molecule LC4 is tilted toward the fourth pretilt direction PD4.

Referring to FIGS. 8 through 10, in an exemplary embodiment, where the pixel PX includes the first and second electrodes PE1 and PE2 (see FIG. 2), and the first through fourth liquid crystal molecules LC1-LC4 are respectively in the first through fourth pretilt directions PD1-PD4, a plurality of domains are defined in the pixel PX. In one exemplary embodiment, for example, the plurality of domains include first through fourth domains DM1-DM4. In such an embodiment, the first through fourth domains DM1-DM4 may be arranged, for example, in a matrix of two rows by two columns in the pixel PX.

In an exemplary embodiment, as shown in FIG. 10, the first domain DM1 is defined as a domain corresponding to an overlapping region of the second and third areas A2 and A3. In such an embodiment, the second through fourth domains DM2-DM4 are defined as domains corresponding to an overlapping region of the first and third areas A1 and A3, an overlapping region of the first and fourth areas A1 and A4, and an overlapping region of the second and fourth areas A2 and A4, respectively.

Referring to FIG. 10, when an electric field is generated in the pixel PX by applying voltages to the first and second electrodes PE1 and PE2 (see FIG. 2), liquid crystal molecules in the first through fourth domains DM1-DM4 are tilted toward different directions from each other. In one exemplary embodiment, for example, when realignment directions of liquid crystal molecules in the first through fourth domains DM1-DM4 are referred respectively as to first through fourth realignment directions AD1-AD4, the first through fourth realignment directions AD1-AD4 are different from each other.

When an electric field is applied to the first domain DM1, the second liquid crystal molecule LC2 adjacent to the first alignment film 140 in the second area A2 is further titled from a position substantially parallel to the second pretilt direction PD2, while the third liquid crystal molecule LC3 adjacent to the second alignment film 340 in the third area A3 is further tilted from a position substantially parallel to the third pretilt direction PD3. Afterward, since the liquid crystal molecules of the liquid crystal layer 200 (see FIG. 3) has elasticity, the second and third liquid crystal molecules, LC2 and LC3, and a fifth liquid crystal molecule (not shown), which is located between the second and third liquid crystal molecules LC2 and LC3, in the first domain DM1 are tilted from positions substantially parallel to the first realignment direction AD1 substantially parallel to a fifth direction D5 that is a direction of a vector sum of the second and third pretilt directions PD2 and PD3.

When an electric field is applied to the second domain DM2, the first liquid crystal molecule LC1 adjacent to the first alignment film 140 in the first area A1 is further titled from a position substantially parallel to the first pretilt direction PD1, while the third liquid crystal molecule LC3 adjacent to the second alignment film 340 in the third area A3 is further tilted from a position substantially parallel to the third pretilt direction PD3. Afterward, since the liquid crystal molecules of the liquid crystal layer 200 has elasticity, the first and third liquid crystal molecules, LC1 and LC3, and a sixth liquid crystal molecule (not shown), which is located between the first and third liquid crystal molecules LC1 and LC3, in the second domain DM2 are tilted from positions substantially parallel to the second realignment direction AD2 substantially parallel to a sixth direction D6 that is a direction of a vector sum of the first and third pretilt directions PD1 and PD3.

When an electric field is applied to the third domain DM3, the first liquid crystal molecule LC1 adjacent to the first alignment film 140 in the first area A1 is further titled from a position substantially parallel to the first pretilt direction PD1, while the fourth liquid crystal molecule LC4 adjacent to the second alignment film 340 in the fourth area A4 is further tilted from a position substantially parallel to the fourth pretilt direction PD4. Afterward, since the liquid crystal molecules of the liquid crystal layer 200 has elasticity, the first and fourth liquid crystal molecules, LC1 and LC4, and a seventh liquid crystal molecule (not shown), which is located between the first and fourth liquid crystal molecules LC1 and LC4, in the third domain DM3 are tilted from positions substantially parallel to the third realignment direction AD3 substantially parallel to a seventh direction D7 that is a direction of a vector sum of the first and fourth pretilt directions PD1 and PD4.

When an electric field is applied to the fourth domain DM4, the second liquid crystal molecule LC2 adjacent to the first alignment film 140 in the second area A2 is further titled from a position substantially parallel to the second pretilt direction PD2, while the fourth liquid crystal molecule LC4 adjacent to the second alignment film 340 in the fourth area A4 is further tilted from a position substantially parallel to the fourth pretilt direction PD4. Afterward, since the liquid crystal molecules of the liquid crystal layer 200 has elasticity, the second and fourth liquid crystal molecules, LC2 and LC4, and an eighth liquid crystal molecule (not shown), which is located between the second and fourth liquid crystal molecules LC2 and LC4, in the fourth domain DM4 are tilted from positions substantially parallel to the fourth realignment direction AD4 substantially parallel to an eighth direction D8 that is a direction of a vector sum of the second and fourth pretilt directions PD2 and PD4.

As such, the liquid crystal molecules of the first through fourth domains DM1-DM4 are all different in realignment directions while activating the pixel PX, such that a viewing angle of the pixel PX is improved.

Figure 11:
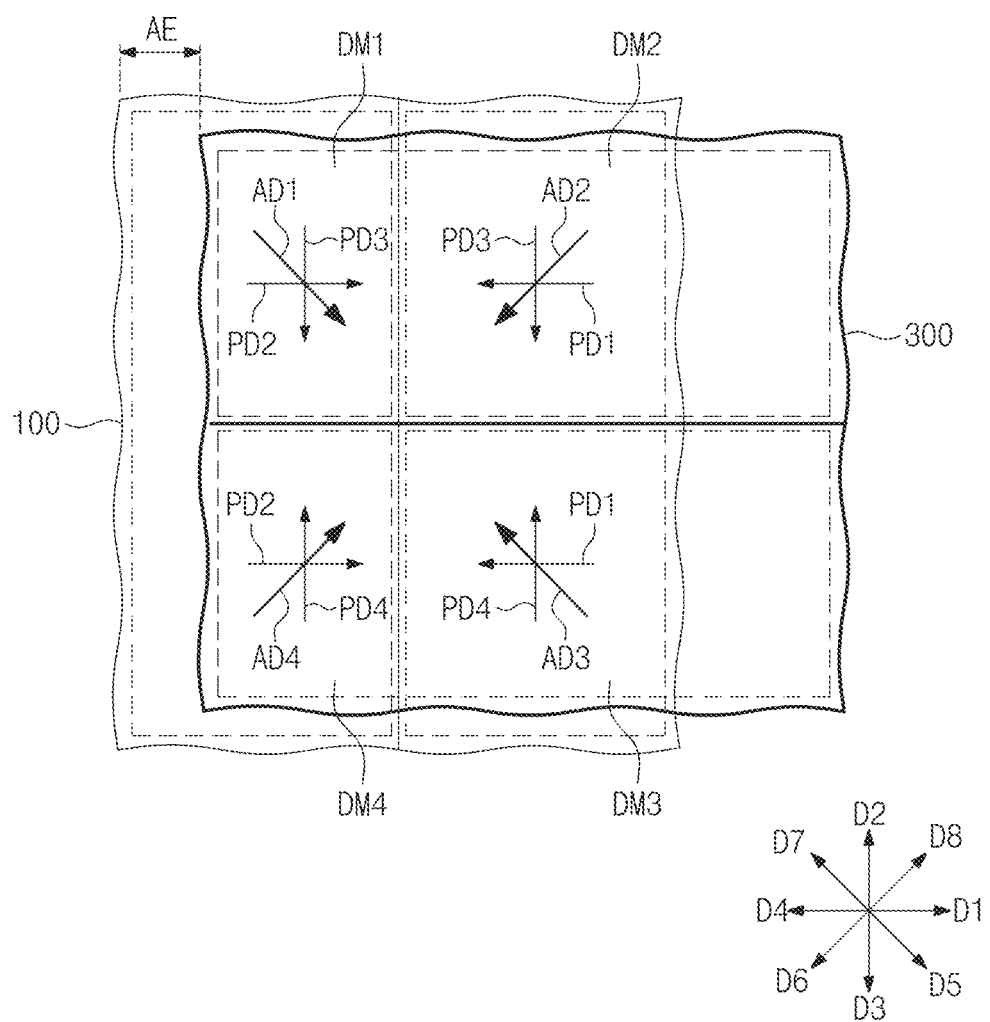
FIG. 11 is a plan view illustrating pretilt directions in the domains when misalignment occurs.

FIG. 11 is a plan view illustrating pretilt directions in the domains when misalignment occurs.

Referring to FIGS. 1 and 11, when the LCD panel 1000 is curved along the first direction D1 as shown in FIG. 1, the array substrate 100 and the opposite substrate 300 may be misaligned along the first and/or fourth directions D1 and D4. In an exemplary embodiment, the array substrate 100 is combined with the opposite substrate 300, being isolated from the opposite substrate 300 by an alignment error AE.

However, even if such misalignment occurs, the first through fourth domains DM1-DM4 may be defined by overlapping regions of the first through fourth areas A1-A4 and the pretilt directions in the first through fourth domains DM1-DM4 are effectively maintained to be substantially identical to those that have been preset before the misalignment.

In such an embodiment, the first domain DM1 contains the fifth liquid crystal molecule set in the first realignment direction AD1 determined by the second and third pretilt directions PD2 and PD3. In such an embodiment, the second through fourth domains DM2-DM4 include the sixth liquid crystal molecule with the second realignment direction AD2 determined by the first and third pretilt directions PD1 and PD3, the seventh liquid crystal molecule with the third realignment direction AD3 determined by the first and fourth pretilt directions PD1 and PD2, and the eighth liquid crystal molecule with the fourth realignment direction AD4 determined by the second and fourth pretilt directions PD2 and PD4, respectively.

In such an embodiment, as described above, the first through fourth realignment directions AD1-AD4 respectively set in the first through fourth domains DM1-DM4 may be determined by the pretilt directions defined in the array substrate 100 and the opposite substrate 300. Therefore, in such an embodiment, even when a misalignment occurs between the array substrate 100 and the opposite substrate 300, there is substantially no change in the pretilt directions of the liquid crystal molecules in the first through fourth domains DM1-DM4 defined within the pixel PX. Accordingly, in such an embodiment, even when a misalignment occurs, a texture pattern is not generated, thereby improving display quality of the LCD panel 1000.

Figure 12A:
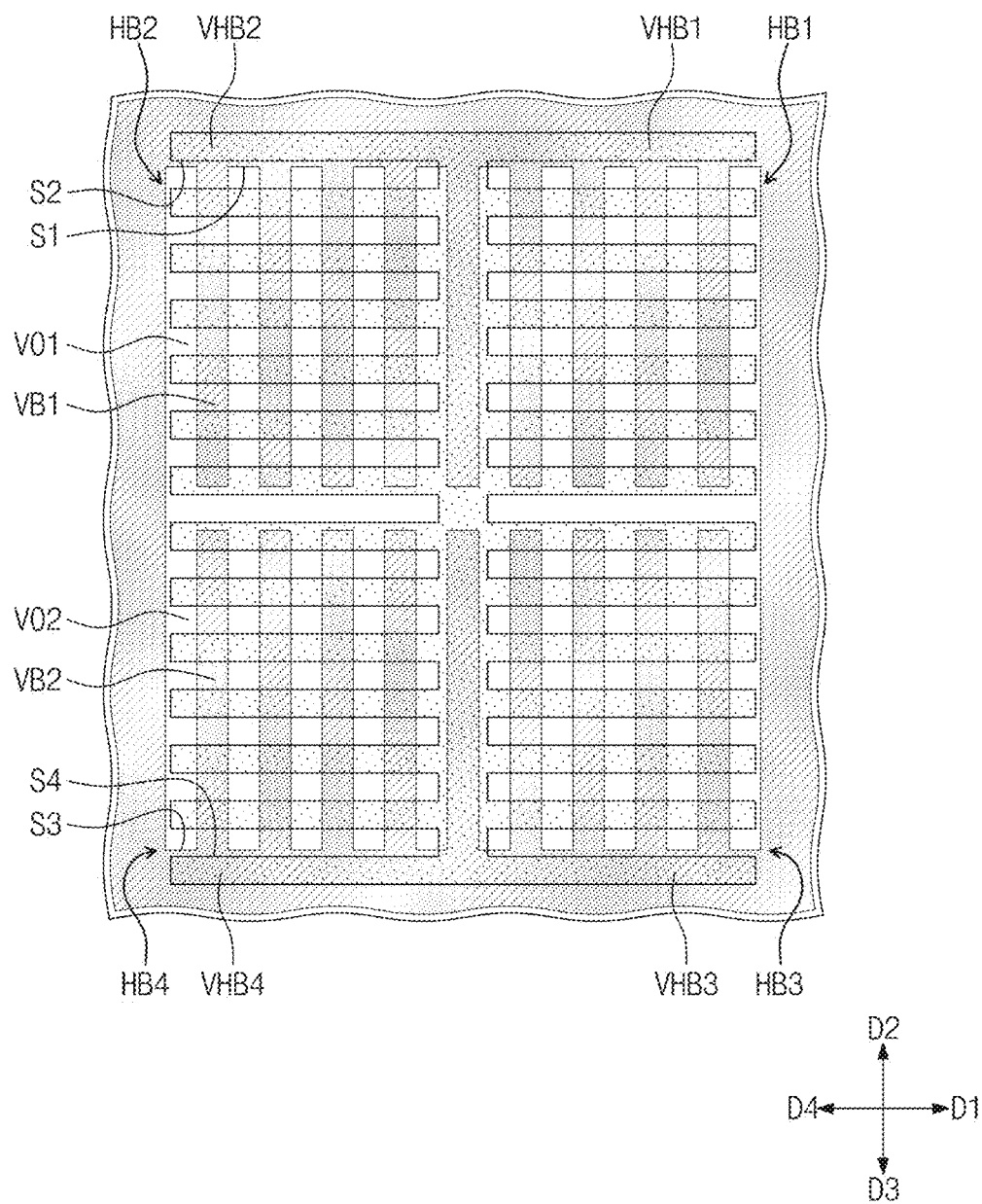
FIGS. 12A and 12B are plan views illustrating exemplary embodiments of first and second electrodes.
Figure 12B:
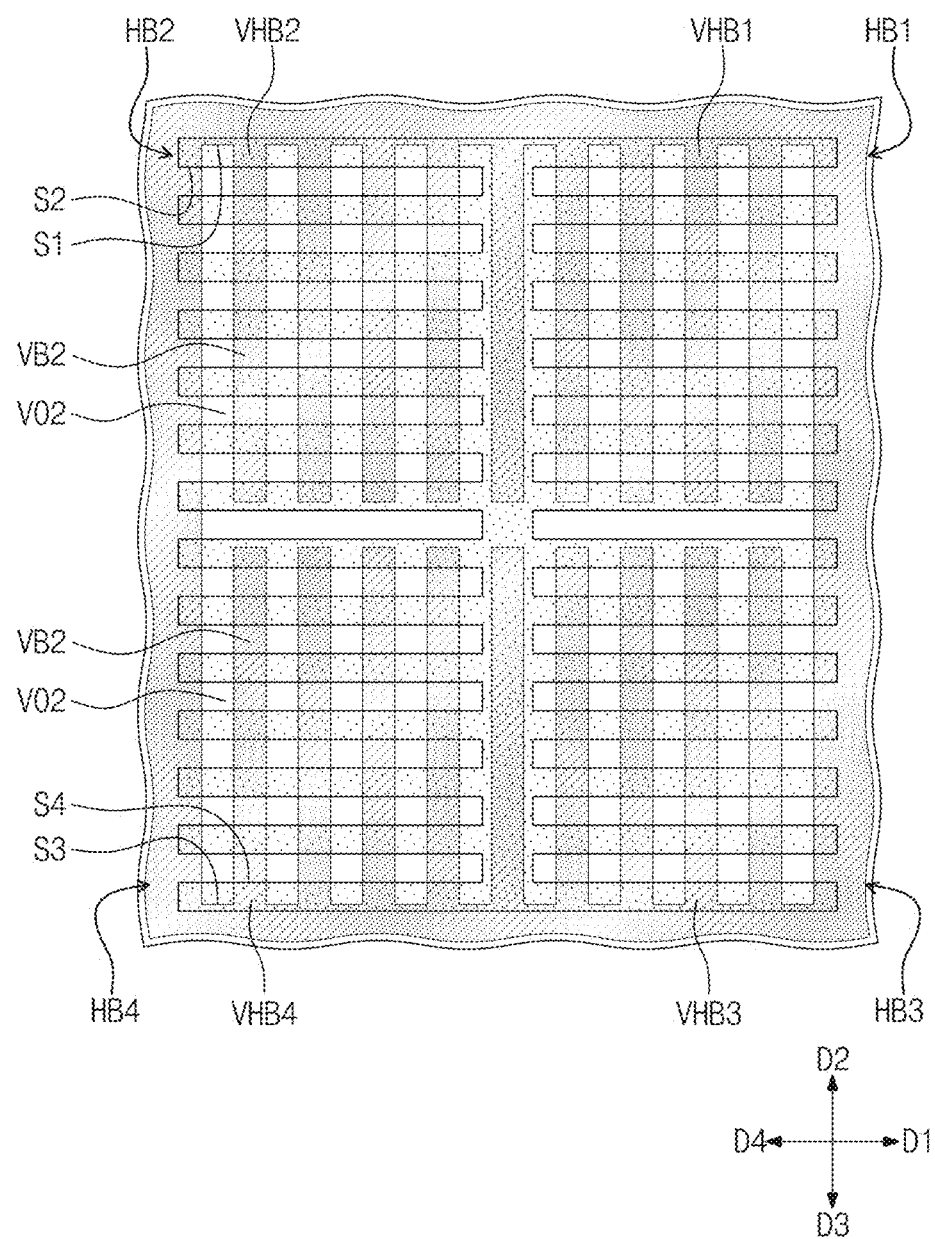
Figure 13A:
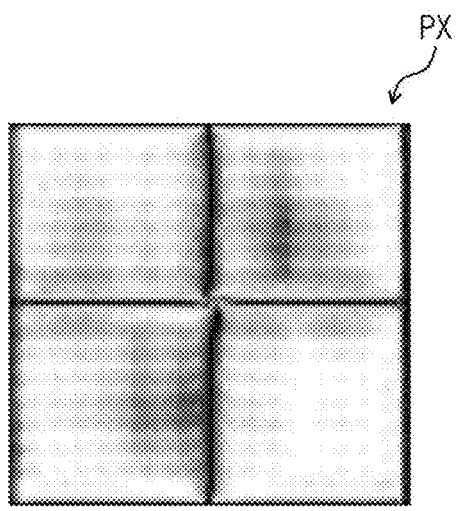
FIGS. 13A and 13B are simulation images showing display qualities of a pixel including the first and second electrodes of FIGS. 12A and 12B, respectively.
Figure 13B:
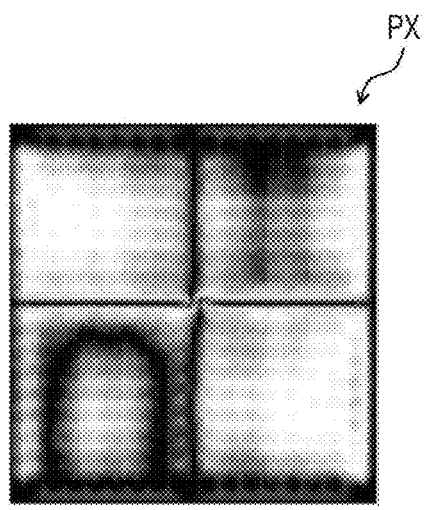

FIGS. 12A and 12B are plan views illustrating exemplary embodiments of first and second electrodes, and FIGS. 13A and 13B are simulation images showing display qualities of a pixel including the first and second electrodes of FIGS. 12A and 12B, respectively.

Hereinafter, exemplary embodiments of first and second electrodes will be described in detail with reference to FIGS. 12A to 13B.

In an exemplary embodiment, as shown in FIG. 12A, the first vertical opening VO1 is disposed spaced apart in the third direction D3 from a first outer horizontal branch VHB1, which is at the farthest side in the second direction D2, among the first horizontal branches HB1, and from a second outer horizontal branch VHB2, which is at the farthest side in the second direction D2, among the second horizontal branches HB2. In such an embodiment, the second electrode PE2 includes a first side S1. The first side S1 is interposed between the first vertical branches VB1, extends along the first direction D1 and connects the first vertical branches VB1 arranged in the first direction D1 to each other. The first and second outer horizontal branches VHB1 and VHB2 include a second side S2. The second side S2 is configured to extend toward the first direction D1 from the inside of the pixel PX on the center of the first and second outer horizontal branches VHB1 and VHB2. In such an embodiment, the second side S2 is located further toward the second direction D2 from a center of the pixel than the first side S1.

In such an embodiment, the second vertical opening VO2 is disposed spaced apart in the second direction D2 from a three outer horizontal branch VHB3, which is at the farthest side along the third direction D3, among the third horizontal branches HB3, and from a fourth outer horizontal branch VHB4, which is at the farthest side along the third direction D3, among the fourth horizontal branches HB4. In such an embodiment, the second electrode PE2 includes a third side S3. The third side S3 is interposed between the second vertical branches VB2, extends along the first direction D1 and connects the second vertical branches VB2 arranged in the first direction D1 to each other. The third and fourth outer horizontal branches VHB3 and VHB4 include a fourth side S4. The fourth side S4 is configured to extend toward the first direction D1 from the inside of the pixel PX on the center of the third and fourth outer horizontal branches VHB3 and VHB4. In such an embodiment, the fourth side S4 is located further toward the third direction D3 from the center of the pixel than the third side S3.

In an alternative exemplary embodiment, as shown in FIG. 12B, the second side S2 may be located further toward the center of the pixel in the third direction D3 than the first side S1, such that the first vertical opening VO1 may overlap the first and second outer horizontal branches VHB1 and VHB2. In such an embodiment, the fourth side S4 may be located toward the center of the pixel in the second direction D2 than the third side S3, such that the second vertical opening VO2 may overlap the third and fourth outer horizontal branches VHB3 and VHB4.

As shown in FIGS. 13A and 13B, there is no texture pattern in the pixel PX in the exemplary embodiment shown in FIG. 12A shows while texture patterns are shown in the exemplary embodiment of the pixel PX shown in FIG. 12B. In the exemplary embodiment shown in FIG. 12B, the texture patterns are concentrated on overlapping regions of the first vertical openings VO1, and the first and second horizontal branches VHB1 and VHB2. The texture patterns are concentrated on overlapping regions of the second vertical openings VO2, and the third and fourth outer horizontal branches VHB3 and VHB4.

As described above, in an exemplary embodiment, the first vertical opening VO1 is defined not to overlap the first and second outer horizontal branches VHB1 and VHB2 and the second vertical opening VO2 is defined not to overlap the third and fourth outer horizontal branches VHB3 and VHB4, such that the texture pattern is effectively prevented from being generated in the pixel PX, thereby improving display quality of the LCD panel 1000.

As described herein, in exemplary embodiments of the invention, a pixel of the LCD panel is segmented into a plurality of domains in which the alignment directions of liquid crystal molecules are determined by the first electrode including first and second sub horizontal openings, and the second electrode including first and second sub vertical openings. Accordingly, in such embodiment, even when a misalignment occurs between the array substrate and the opposite substrate, the realignment direction in the domains is not changed, such that a texture pattern that may occur due to the misalignment may be effectively prevented from being generated, thereby improving the quality of the LCD panel.

While the invention has been described with reference to exemplary embodiments, it will be apparent to those skilled in the art that various changes and modifications may be made without departing from the spirit and scope of the present invention. Therefore, it should be understood that the above embodiments are not limiting, but illustrative.

What is claimed is:

1. A display panel curved along a first direction, comprising:
    a first substrate comprising:
        first and second areas corresponding to two segments of a pixel divided by an imaginary line in a second direction perpendicular to the first direction; and
        a first electrode, in which a plurality of first sub horizontal openings is defined in the first area, and a plurality of second sub horizontal openings is defined in the second area, wherein the first and second sub horizontal openings extend along the first direction;
    a second substrate disposed opposite to the first substrate, and comprising:
        third and fourth areas corresponding to two segments of the pixel divided by an imaginary line in the first direction; and
        a second electrode, in which a plurality of first vertical openings is defined in the third area and, and a plurality of second vertical openings is defined in the fourth area, wherein the first and second vertical openings extend along the second direction; and
    a liquid crystal layer interposed between the first and second substrates,
    wherein
    a main horizontal opening is defined in the second electrode in the first direction along a boundary of the third and fourth areas, and
    the plurality of first vertical openings is branched out from the main horizontal opening toward the second direction.

2. The display panel according to claim 1, wherein the second vertical openings are branched out from the main horizontal opening toward a third direction opposite to the second direction.

3. The display panel according to claim 2, wherein the first vertical openings are substantially symmetrical to the second vertical openings with respect to the main horizontal opening.

4. The display panel according to claim 3, wherein the first sub horizontal openings are substantially symmetrical to the second sub horizontal openings along a boundary of the first and second areas.

5. The display panel according to claim 4, wherein
    the second electrode comprises:
        a plurality of first vertical branches disposed in the third area and defining the first vertical openings; and
        a plurality of second vertical branches disposed in the fourth area and defining the second vertical openings,
    the first electrode comprises:
        a vertical stalk extending substantially in the second direction along the boundary of the first and second areas; and
        a plurality of horizontal branches bilaterally extending along the first direction from the vertical stalk and defining the first and second sub horizontal openings.

6. The display panel according to claim 5, wherein
    the third and fourth areas are defined in sequence along the third direction,
    the first vertical openings are spaced apart in the third direction toward a center of the pixel from a horizontal branch which is disposed farthest in the second direction among the horizontal branches,
    the second vertical openings are spaced apart in the second direction toward the center of the pixel from a horizontal branch which is disposed farthest in the third direction among the horizontal branches.

7. The display panel according to claim 6, wherein the horizontal branches comprise:
    a plurality of first horizontal branches extending from the vertical stalk toward the first direction and disposed in the first area; and
    a plurality of second horizontal branches extending from the vertical stalk toward a fourth direction opposite to the first direction and disposed in the second area.

8. The display panel according to claim 1, wherein
    the pixel is divided into a plurality of domains and,
    pretilt directions of liquid crystal molecules of the liquid crystal layer in the domains are different from each other.

9. The display panel according to claim 8, wherein
    the domains comprise first through fourth domains,
    the first domain is defined by an overlapping region of the second area and the third area,
    the second domain is defined by an overlapping region of the first area and the third area,
    the third domain is defined by an overlapping region of the first area and the fourth area,
    the fourth domain is defined by an overlapping region of the second area and the fourth area.

10. The display panel according to claim 9, wherein
    a realignment direction of the liquid crystal molecules in the first domain is determined by a vector sum of the first and third directions,
    a realignment direction of the liquid crystal molecules in the second domain is determined by a vector sum of the third and fourth directions,
    a realignment direction of the liquid crystal molecules in the third domain is determined by a vector sum of the second and fourth directions, a realignment direction of the liquid crystal molecules in the fourth domain is determined by a vector sum of the first and second directions.

11. The display panel according to claim 10, wherein realignment directions of the liquid crystal molecules of the liquid crystal layer in the domains are different from each other.

12. The display panel according to claim 1, wherein
the first substrate further comprises a first alignment film interposed between the liquid crystal layer and the first electrode,
the second substrate further comprises a second alignment film interposed between the liquid crystal layer and the second electrode.

13. The display panel according to claim 12, wherein each of the first and second alignment films comprises a photo-hardening layer comprising a side-chain polymer which maintains pretilts of the liquid crystal molecules adjacent thereto.

14. The display panel according to claim 1, wherein widths of the first and second vertical openings are substantially the same as each other.

15. The display panel according to claim 1, wherein widths of the first and second sub horizontal openings are substantially the same as each other.

16. The display panel according to claim 1, wherein liquid crystal molecules of the liquid crystal layer are homeotropically aligned and have negative permittivity.

17. The display panel according to claim 1, wherein the first and second electrodes comprise a transparent conductive material.

* * * * *